US008738931B1

(12) United States Patent
Funk

(10) Patent No.: US 8,738,931 B1
(45) Date of Patent: May 27, 2014

(54) METHOD FOR DETERMINING AND PROTECTING PROPRIETARY SOURCE CODE USING MNEMONIC IDENTIFIERS

(71) Applicant: Conley Jack Funk, Fort Myers, FL (US)

(72) Inventor: Conley Jack Funk, Fort Myers, FL (US)

( * ) Notice: Subject to any disclaimer, the term of this patent is extended or adjusted under 35 U.S.C. 154(b) by 0 days.

(21) Appl. No.: 14/058,397

(22) Filed: Oct. 21, 2013

(51) Int. Cl.
| | | |
|---|---|---|
| *G06F 11/30* | (2006.01) | |
| *G06F 12/14* | (2006.01) | |
| *G06F 9/45* | (2006.01) | |
| *G06F 7/04* | (2006.01) | |
| *G06F 15/16* | (2006.01) | |
| *G06F 17/30* | (2006.01) | |
| *H04L 29/06* | (2006.01) | |
| *G06F 21/12* | (2013.01) | |
| *G06F 21/60* | (2013.01) | |
| *G06F 21/52* | (2013.01) | |

(52) U.S. Cl.
CPC ............... *G06F 21/12* (2013.01); *G06F 21/60* (2013.01); *G06F 21/52* (2013.01)
USPC ........... 713/189; 717/137; 717/141; 717/154; 726/6; 726/22; 726/26; 713/187

(58) Field of Classification Search
CPC ....... G06F 21/60; G06F 21/602; G06F 21/64; G06F 21/10; G06F 21/52; G06F 21/51; G06F 21/6218; G06F 21/78; G06F 21/00; G06F 2221/2107; H04L 2209/16; G11B 20/00086
USPC .......................................................... 713/189
See application file for complete search history.

(56) References Cited

U.S. PATENT DOCUMENTS

| | | | | | |
|---|---|---|---|---|---|
| 5,754,849 | A | * | 5/1998 | Dyer et al. ............................ 1/1 |
| 6,055,365 | A | * | 4/2000 | Tye ................ 716/123 |
| 6,158,047 | A | * | 12/2000 | Le et al. ......................... 717/153 |
| 6,334,189 | B1 | * | 12/2001 | Granger et al. ................. 726/26 |
| 6,389,385 | B1 | * | 5/2002 | King ................................ 703/27 |
| 6,389,481 | B1 | * | 5/2002 | Malcolm ....................... 719/310 |
| 6,594,761 | B1 | * | 7/2003 | Chow et al. ................... 713/190 |
| 6,643,775 | B1 | * | 11/2003 | Granger et al. ............... 713/190 |
| 6,668,325 | B1 | * | 12/2003 | Collberg et al. .............. 713/194 |
| 6,681,382 | B1 | * | 1/2004 | Kakumani et al. ............ 717/122 |
| 6,842,862 | B2 | * | 1/2005 | Chow et al. ................... 713/190 |
| 6,993,752 | B2 | * | 1/2006 | Batthish ........................ 717/137 |
| 7,506,177 | B2 | * | 3/2009 | Chow et al. ................... 713/194 |
| 7,530,107 | B1 | * | 5/2009 | Ono et al. ........................ 726/25 |
| 7,549,147 | B2 | * | 6/2009 | Futoransky et al. .......... 717/155 |
| 7,689,969 | B1 | * | 3/2010 | Wendling ...................... 717/105 |
| 7,719,535 | B2 | * | 5/2010 | Tadokoro et al. ............. 345/467 |
| 7,779,270 | B2 | * | 8/2010 | Horning et al. ............... 713/187 |

(Continued)

FOREIGN PATENT DOCUMENTS

EP          1762957 A1 *  3/2007

*Primary Examiner* — Carolyn B Kosowski

(57) ABSTRACT

A semantics engine is described that produces a semantically-impaired but equivalent version of the original source code that can be compiled and executed using conventional tools for commonly used programming languages. This semantically-impaired source code and the compiled assemblies it produces are incomprehensible to anyone who would attempt to read them. The semantics-impairing process is irreversible both at the source and the assembly levels and the machine code generated by the semantically-impaired source code is exactly the same as that produced by the original source code. The semantics engine achieves confidentiality without using encryption or compression. All protective modifications are made directly to copies of the original source code thereby introducing no intermediate forms of the code.

20 Claims, 6 Drawing Sheets

(56) References Cited

U.S. PATENT DOCUMENTS

| | | | |
|---|---|---|---|
| 7,877,613 B2* | 1/2011 | Luo | 713/187 |
| 7,937,693 B2* | 5/2011 | Victorov | 717/141 |
| 8,060,868 B2* | 11/2011 | Meijer et al. | 717/141 |
| 8,249,249 B2* | 8/2012 | Lin | 380/28 |
| 8,386,461 B2* | 2/2013 | Bachmann | 707/711 |
| 8,392,888 B2* | 3/2013 | Ehrman et al. | 717/126 |
| 8,452,983 B2* | 5/2013 | Lin | 713/190 |
| 8,495,358 B2* | 7/2013 | Johnston et al. | 713/153 |
| 8,510,571 B1* | 8/2013 | Chang et al. | 713/191 |
| 2005/0188270 A1* | 8/2005 | Dollin et al. | 714/38 |
| 2006/0041873 A1* | 2/2006 | Pandarinathan et al. | 717/141 |
| 2008/0189689 A1* | 8/2008 | Tramontana et al. | 717/143 |
| 2012/0079282 A1* | 3/2012 | Lowenstein et al. | 713/189 |
| 2012/0151600 A1* | 6/2012 | Yun et al. | 726/26 |
| 2012/0272329 A1* | 10/2012 | Grammer et al. | 726/26 |

* cited by examiner

METHOD FOR DETERMINING AND PROTECTING PROPRIETARY SOURCE CODE USING MNEMONIC IDENTIFIERS

CROSS REFERENCE OF RELATED APPLICATIONS (none)

STATEMENT REGARDING FED SPONSORED R & D (none)

REFERENCE TO MICROFICHE APPENDIX (none)

FIELD OF THE INVENTION

The field of this invention is the protection of the intellectual property that exists in the form of computer source code. The problem is two-fold since unprotected source code can be stolen and it can also be regenerated from executable assemblies.

STATE OF THE PRIOR ART

It is always an objective of software programmers to write source code that is clear and understandable for the sake of maintainability by using meaningful mnemonic identifiers and abundant program level documentation.

The traditional achievement of using meaningful mnemonic identifiers and clearly documenting the details relating to the data and procedures of the computer software programs leaves businesses vulnerable to theft of guarded proprietary secrets.

Numerous techniques have been proposed that scramble the object code or intermediate assembly code generated by a language compiler to prevent its conversion back to the original source code. Such techniques do not address the more important problem of source code theft. Further, these object or assembly scramblers are vulnerable since the executable assemblies of the .Net languages, for example, can be reversed easily to their original source code.

The semantics awareness is limited at the object or assembly levels for protection methods that work there because the information necessary to deal with semantics effectively is only available at the pure source code level.

None of the methods that scramble code at the assembly or object levels can achieve the equivalent or similar execution as that of their original source code and still be irreversible due to the lack of information available to them. They have insufficient information to determine the global nature of mnemonic identifiers, thereby limiting what they can do. In general, these methods that scramble assembly code must reverse their own processes prior to the generation of machine code thereby adding additional vulnerability.

No methods that claim to protect confidentiality are known to be effective where the original source code is concerned. Yet, theft of source code by internal employees represents the greatest threat statistically for loss of confidentiality of proprietary information in computer programs.

Some methods employ encryption and compression techniques at the assembly level to make reversibility to source code more difficult. Sophisticated tools, however, are available today as freeware that can reverse these methods in a short time. In fact, the only valid justification to use encryption or compression to achieve confidentiality is that reversibility is somehow a requirement of the method in question.

In addition, encryption and compression often cause programs in execution to be flagged as malware and possibly intercepted by anti-virus components of an operating system.

Further, the use of encryption and compression are not allowed by application market places due to the difficulty it creates for detecting concealed malware.

It is a benefit for this invention that the assemblies generated from compilation of the semantically-impaired source code automatically inherit the irreversible semantically-impaired characteristics of the original source code that are produced by the semantics engine.

No other method exists today that achieves the results of this invention, namely (1) irreversible, semantically-impaired but equivalent source code; (2) machine code of the semantics-impaired source exactly matches the machine code of the original source code; (3) confidentiality without using encryption or compression; (4) standard compilation tools used in conjunction with this invention; (5) semantically-impaired and irreversible execution assemblies (6) no introduction of complicating intermediate code forms.

SUMMARY AND OBJECTS OF THE INVENTION

The present invention is a computer software based semantics engine comprising both language-specific and manual parsers, and a semantic processor further comprising procedures to construct a list of semantic mnemonic identifiers, and a program documentation eliminator.

The invention works for any of the commonly used programming languages and a language-specific parser can be added for any language, present or future. Parsing can also be done manually, both interactively and by the use of batch scripts.

It is an object of the invention that the semantics engine outputs semantically-impaired source code in such a way that the proprietary information in the source code is rendered incomprehensible to humans.

Another object of this invention is that the process of producing semantically-impaired source code is irreversible to assure confidentiality.

Another object of the invention is that semantically-impaired source code, when compiled, produces assemblies that are also incomprehensible and irreversible.

Another object of the invention is that semantically-impaired source code, when compiled, produces assemblies with different nonsense character strings for each compilation making it more difficult for penetration hackers and reverse-engineers.

Another object of the invention is that semantically-impaired source code files are usable by developers as functional source code components of projects where other source files are routinely modified and the entire project can be recompiled using customary tools.

Another object of this invention is that compiled semantically-impaired source code produces exactly the same execution results as the original pure source code.

Another object of this invention is that executable programs compiled from semantically-impaired source code can be successfully submitted to commercial online application stores by avoiding the use of forbidden techniques such as encryption and compression.

Another object of this invention is that the semantics engine operates as a stand-alone utility.

Another object of this invention is that the semantics engine is incorporated within an integrated software development environment such as the Visual Studio.

Another object of this invention is that the semantics engine is incorporated into application-specific meta-languages that generate source code.

Another object of this invention is that the semantics engine is incorporated into standard language compilers that generate semantically-impaired source code as a preprocessing step.

DETAILED DESCRIPTION OF THE PREFERRED EMBODIMENTS

Figure 1:
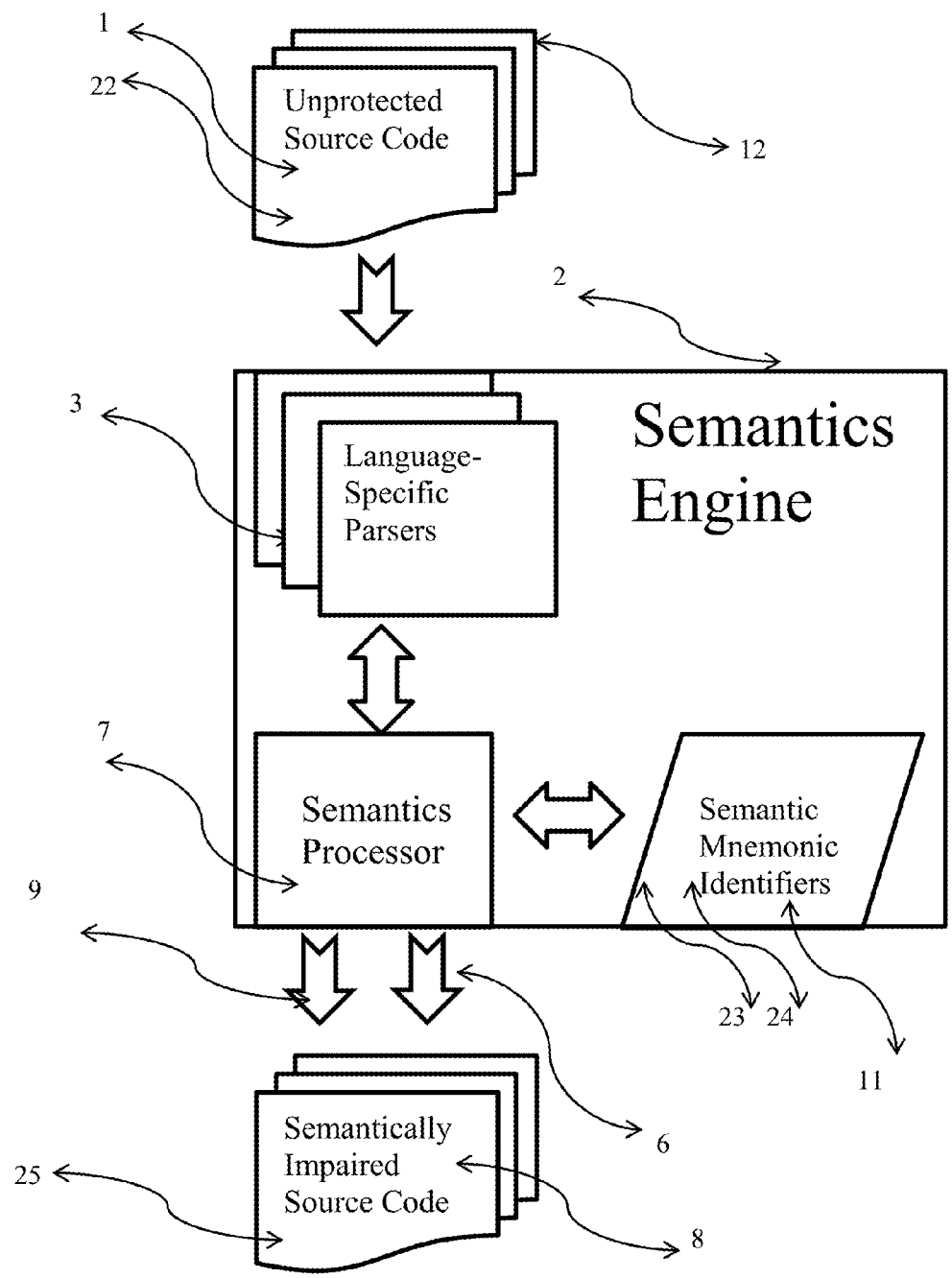
FIG. 1 shows the present invention used as a stand-alone utility that is independent of any particular development environment. The unprotected source code comprises one or more original unprotected source code files. The semantics engine comprises components that parse and replace the semantic mnemonic identifiers with nonsense character strings and replace all of the program level documentation with spaces. The output of the semantic engine is semantically-impaired source code that is suitable as input to a standard language compiler but has been rendered unintelligible to humans in order to protect the confidentiality of the intellectual property in the original pure source code.

A preferred embodiment of the present invention is shown as a stand-alone utility in FIG. 1 that is independent of any particular development environment. The semantics engine 2 operates on unprotected source code 1 thereby producing semantically-impaired source code 8. The semantics engine 2 works for any operating environment, present or future, including but not limited to the Windows operating systems, the Linux operating systems, the Unix operating systems, the MAC operating system, the IOS operating system and the Android operating system.

The list 11 of semantic mnemonic identifiers are determined for the unprotected source code 1 by parsing each source code file 12 of the unprotected source code 1 using a language-specific parser 3 to determine the mnemonic identifiers 22. Each mnemonic identifier 22 is further determined to be a defining mnemonic identifier 23 or a referencing mnemonic identifier 24. The defining mnemonic identifiers 23 and all matching referencing mnemonic identifiers 24 are placed in a list 11 of semantic mnemonic identifiers that is used to determine which mnemonic identifiers 22 are to be replaced by the semantics processor 7.

A defining mnemonic identifier 23 is the symbolic name of a unique source procedure or data item or set of data items from the unprotected source code 1. A referencing mnemonic identifier 24 is a mnemonic pointer or mnemonic reference to a defining mnemonic identifier 23. For most languages, the symbols in the names of the referencing and the defining mnemonic identifiers 23 match exactly.

Language-specific parsers 3 can be added to the semantics engine 2 for any programming language, present or future, including but not limited to the C# language, the C++ language, the Visual Basic language, the SQL language, the JAVA language, the MYSQL language, the ORACLE languages, the web development languages, the scripting languages including JavaScript, application-specific languages, or assembly languages.

Figure 5:
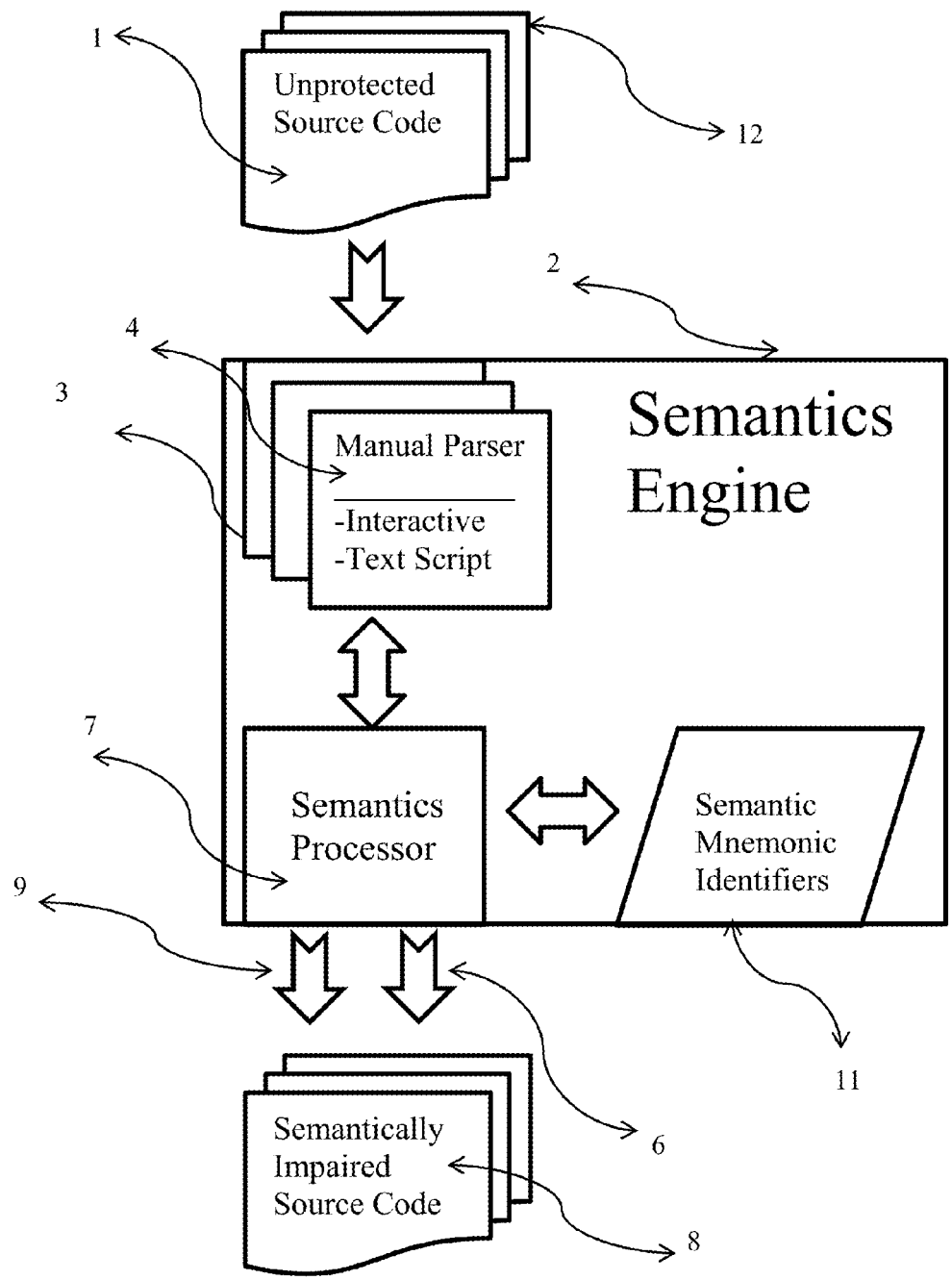
FIG. 5 shows the present invention with the same components as in FIG. 1, except that a language-specific parser is either replaced by or augmented by a manual process of a person interacting with the unprotected source code files to specify the semantic mnemonic identifiers to be replaced in the source code by the semantics engine. The manual process could also be accomplished by use of a prepared script to specify the semantic mnemonic identifiers and to describe rules for removing program documentation.

The list 11 of semantic mnemonic identifiers for the unprotected source code 1 can also be determined by a manual parsing process 4 that can augment or can be used in place of a language-specific parser as shown in FIG. 5. In this case, a person makes decisions interactively 4 using a manual process to determine the defining mnemonic identifiers 23 that are included in the list 11 of semantic mnemonic identifiers to be replaced. Referencing mnemonic identifiers 24 are located by the semantics processor 7 and placed in the list 11 of semantic mnemonic identifiers to be replaced.

A script 4 is generated by the interactive process 4 that can be used to determine the list 11 of semantic mnemonic identifiers without manual intervention in subsequent invocations of the semantics engine 2 for the same unprotected source code 1. This script 4 also describes rules for removing program documentation.

The script 4 can also be created and updated manually using a text editor.

As previously mentioned, the semantics processor 7 creates a list 11 of semantic mnemonic identifiers to be replaced comprising data items, sets of data items and procedure names from the original unprotected source code 1. The file-offsets of each identifier relative to the location within the original source file 12 are recorded in list 11 of semantic mnemonic identifiers to be replaced. The reference and definition-matched mnemonic identifiers 22 comprise the completed list 11 of semantic mnemonic identifiers to be replaced. Matched references and definitions are managed by the semantics processor 7 to assure that no undefined symbol errors occur during compilation as a result of the mnemonic identifier replacements 6.

The semantics processor 7 replaces all comments and program level documentation characters with spaces or other characters that do not alter the compilation process 9 thereby leaving intact all of the file-offsets recorded in the list 11 of semantic mnemonic identifiers to be replaced for the mnemonic identifiers 22 that are located in each of the unprotected source code files 12.

The mnemonic identifiers 22 from the original unprotected source code 1 that are in the list 11 of semantic mnemonic identifiers to be replaced are systematically replaced 6 with meaningless, but syntactically valid nonsense character strings 25 randomly created by the semantics processor 7 without regard to the makeup of the mnemonic identifier 22 from the original unprotected source code 1. For example:

Accounts payable could be replaced by vh2inHNKl16fTtbyuJ10101

Part-cost could be replaced by vh2inHNK1l6fTtbyuJ10101

The symbol vh2inHNKl16fTtbyuJ10101 is not a function of, nor in any way derived from the symbol Accounts payable and there is no basis for the replacement process 6 to be reversed since the list 11 of semantic mnemonic identifiers to be replaced, being the only key, is destroyed after symbol replacement 6 operations are complete.

Further, for every subsequent semantic engine 2 invocation, the randomly generated nonsense character strings 25 are different and unrelated to previous invocations, thereby making the scenario more difficult for a reverse-engineer or for a potential penetration threat by a hacker.

It may appear that the two nonsense strings used above are identical but they are not.

vh2inHNKl16fTtbyuJ10101
vh2inHNK1l6fTtbyuJ10101

There is one instance of a transposition of the number 1 and the letter l. It is a feature of the semantics engine 2 that nonsense character strings 25 that are replacements for different semantic mnemonic identifiers are visually indistinguishable from each other. This inability to distinguish one identifier from another further impairs a person's visual ability to understand the semantically-impaired source code 8.

The nonsense character strings 25 are syntactically valid identifiers for the specific language. The execution results are the same as when Accounts payable was used as the mnemonic identifier 22 since both kinds of identifiers ultimately resolve to the same computer machine code addresses for execution.

In fact, the machine code objects produced by standard compilation of the unprotected original source and the semantically-impaired source code are identical making them equivalent other than (1) the semantically-impaired source code 8 is humanly incomprehensible, and (2) the nonsense character strings 25 are inherited by the semantically-impaired assemblies 21 and they are irreversible to the original source code identifiers.

Unprotected source code 1 is copied to a location secured by the owner of the source code in order to preserve the confidentiality of the original unprotected source code 1 and availability of the original unprotected source code 1 is controlled by techniques that enforce access according to a basis of need-to-know, job function or title, or purely discretionary permission determined by the owner of the information or by an administrator.

The set of unprotected source code 1 ranges from one source file to all source files for a given project. It is a requirement that all of the unprotected source files 12 with referencing mnemonic identifiers 24 are included to avoid undefined symbol errors.

The simplicity of said semantics engine 2 assures that the configuration management requirements of an organization are not hampered, namely:

(1) all of the protection modifications are confined to copies of the original unprotected source code files 1, (2) the original unprotected source code 1 and the corresponding semantically-impaired source code 8 are equivalent and interchangeable as components of a development project, (3) the original unprotected source code files 1 are always backed-up in a secure location where access is controlled, and (4) there are no intermediate forms of the original unprotected source code 1 to manage.

Figure 2:
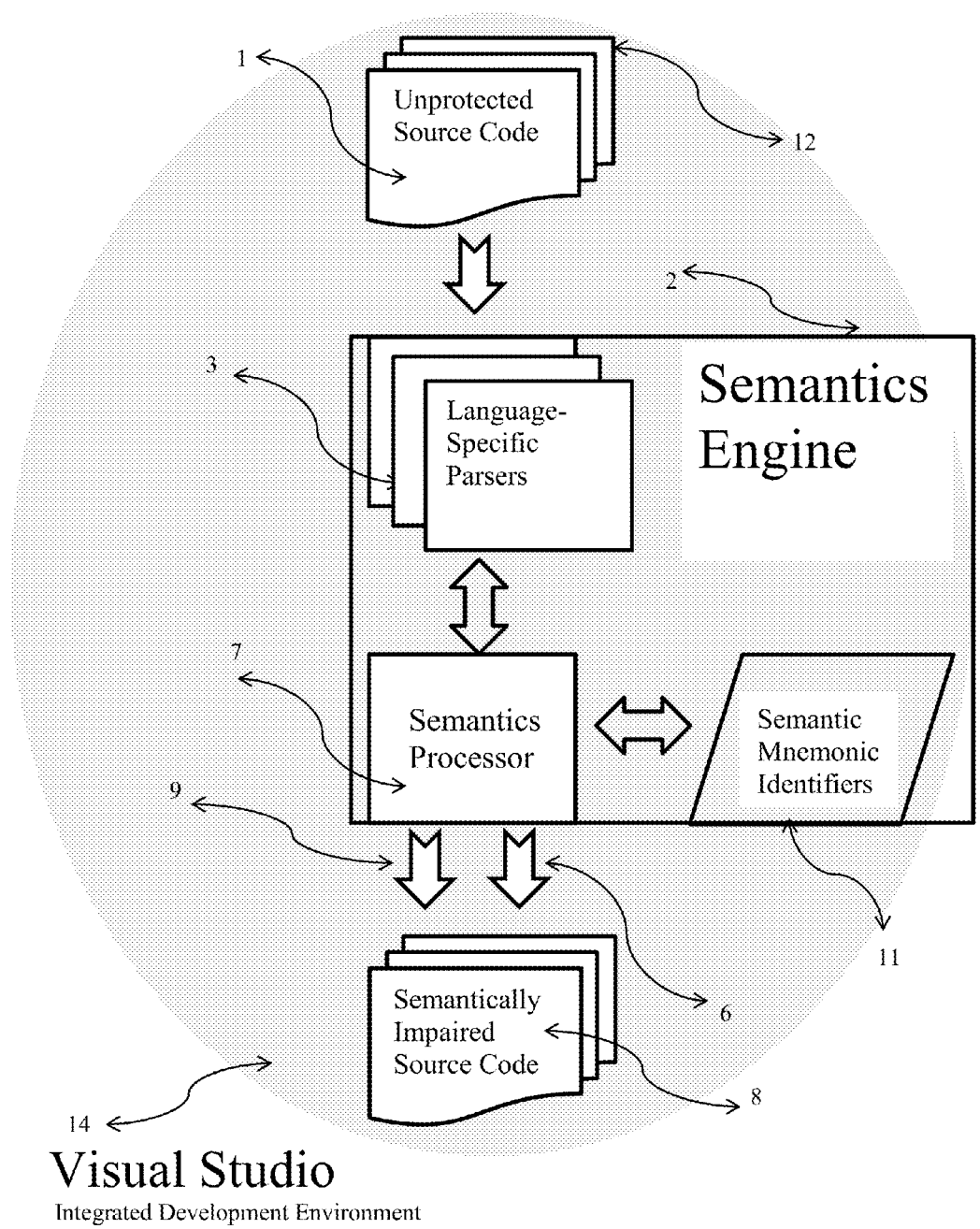
FIG. 2 shows the present invention with the same components as in FIG. 1, except that they are incorporated as features of an integrated development environment shown as the Visual Studio.

Another preferred embodiment of the invention is shown in FIG. 2 where the semantics engine 2 is incorporated as a feature of an integrated development environment shown as the Visual Studio 14. This produces an intuitive mode of operation for developers that is familiar and efficient.

Figure 3:
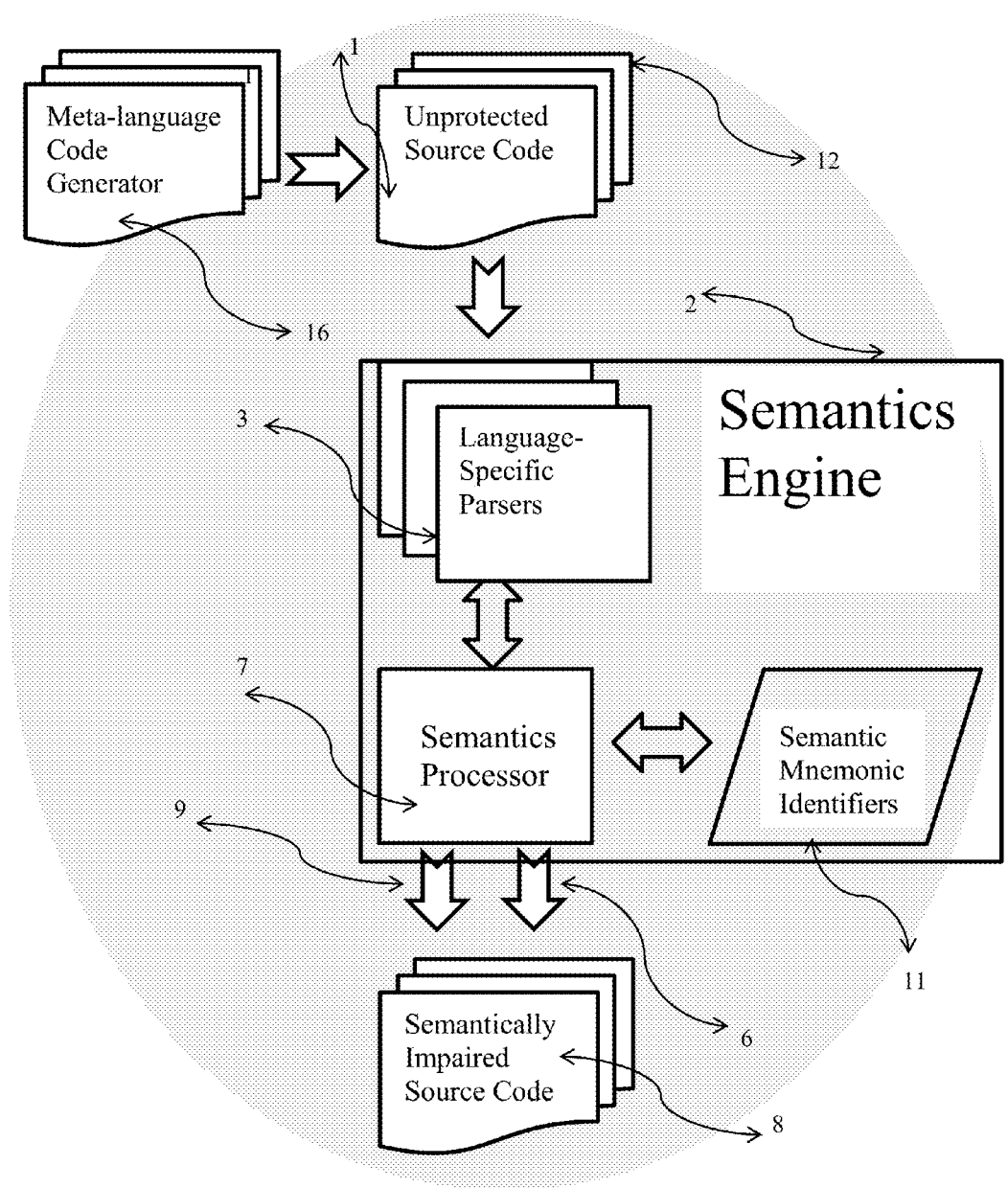
FIG. 3 shows the present invention with the same components as in FIG. 1, except that they are incorporated as follow-on processing to an application-specific code generator shown as a meta-language used for development of applications where the meta-language produces the source code.

Another preferred embodiment of the invention is shown in FIG. 3 where the semantics engine 2 is incorporated into an application-specific code generator 16. In this embodiment, the unprotected source code 1 is the output of a meta-language code generator and this unprotected source code 1 is used to produce semantically-impaired source code 8.

Figure 4:
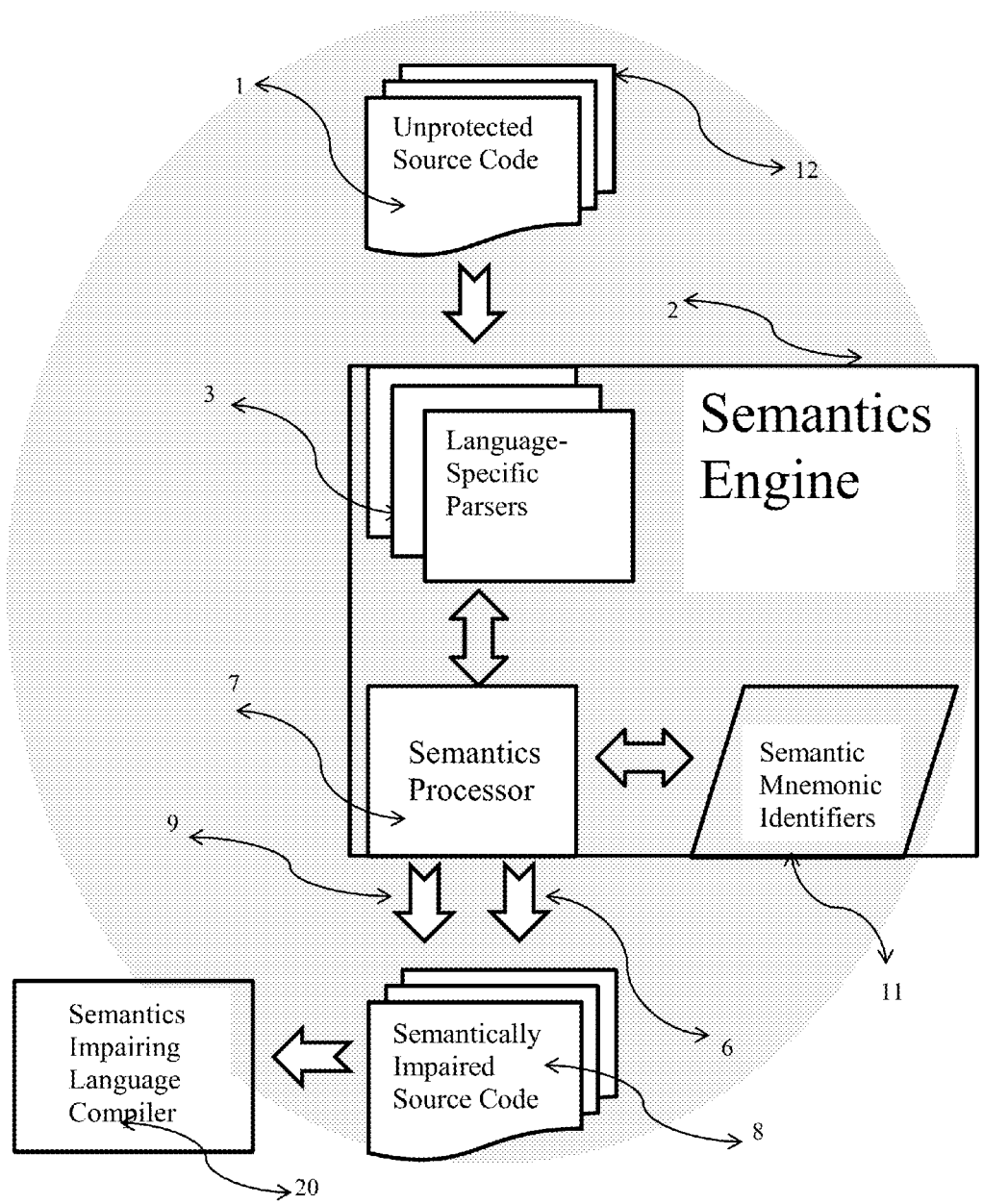
FIG. 4 shows the present invention with the same components as in FIG. 1, except that the semantics engine is incorporated as a preprocessing component of a standard language compiler that produces a semantics-impairing language compiler.

Another preferred embodiment of the invention is shown in FIG. 4 where the semantics engine 2 is incorporated as a preprocessor to a standard language compiler yielding a semantics-impairing language compiler 20.

Figure 6:
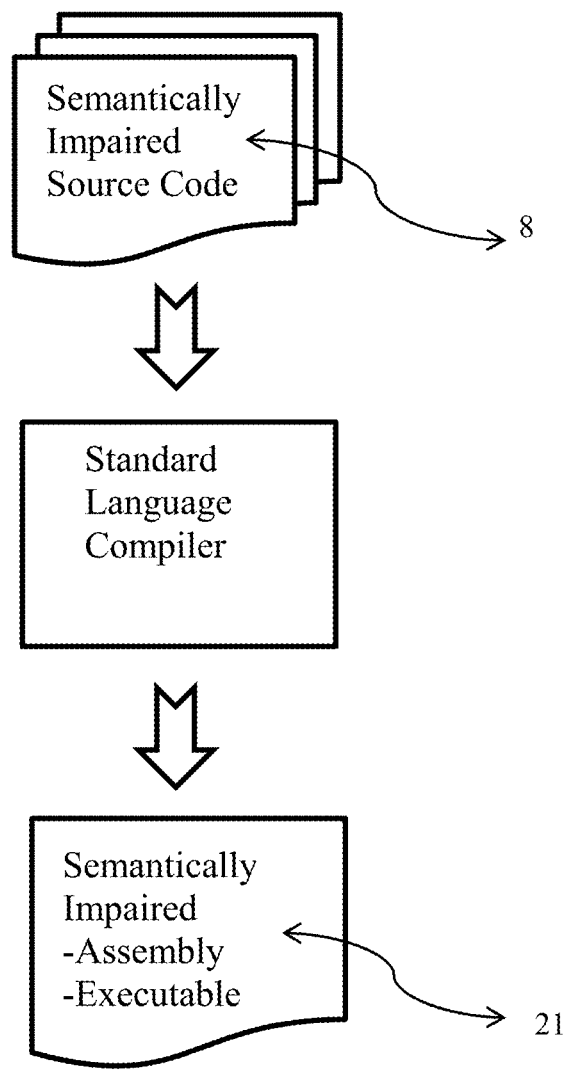
FIG. 6 shows that when the semantically-impaired source code is compiled with a standard language compiler, it is a benefit that the assemblies or executable programs generated are also semantically-impaired.

Semantically-impaired source code 8 only produces semantically-impaired assembly code or executable 21 as shown in FIG. 6.

In conclusion, the present invention is a computer software based semantics engine comprising both language-specific and manual parsers, and a semantic processor further comprising procedures to construct a list of semantic mnemonic identifiers, and a program documentation eliminator.

The invention claims that the semantics engine outputs semantically-impaired source code in such a way that the proprietary information in the source code is rendered incomprehensible to humans.

What is claimed is:

1. A method that utilizes a semantics engine comprising parsers and a semantics processor to determine and semantically-impair the proprietary information in source code, thereby rendering said proprietary information incomprehensible to humans, said method comprising:

parsing said source code to determine defining mnemonic identifiers, said defining mnemonic identifiers comprising mnemonic identifiers that define a data item, a set of data items, or a procedure, further parsing said source code to determine referencing mnemonic identifiers, said referencing mnemonic identifiers comprising mnemonic identifiers that are identical to and thereby matching at least one of said defining mnemonic identifiers, determining a list of semantic mnemonic identifiers comprising said proprietary information by said semantics processor, said list comprising one or more of said defining mnemonic identifiers, and each of said one or more matching referencing mnemonic identifiers, semantically-impairing said proprietary information by replacing one or more of said semantic mnemonic identifiers in said list with nonsense character strings.

2. The method of claim 1 further including replacing one or more program documentation characters with spaces or other characters that do not change a compilation process thereby producing semantically-impaired source code.

3. The method of claim 2 wherein said nonsense character strings inherited by the executable programs or assemblies during the compilation of said semantically-impaired source code cannot be reversed to reveal the mnemonic identifiers they replaced.

4. The method of claim 2 wherein said replacing is confined to a copy of said source code, said replacing producing said semantically-impaired source code with no intermediate forms being required or produced.

5. The method of claim 2 wherein said semantically-impaired source code files comprise one or more components of software development projects, source code files are modified and said software development projects are recompiled using a standard compiler.

6. The method of claim 2 wherein machine code, compiled from said semantically-impaired source code, executes exactly the same as machine code compiled from said source code.

7. The method of claim 2 wherein executable programs and assemblies, compiled from said semantically-impaired source code, are suitable for submission to online application stores and market places.

8. The method of claim 2 wherein said semantics engine is usable as a tool that is available in versions comprising at least one of:
    stand-alone versions,
    integrated software development environments,
    application-specific source code generating versions, or
    a semantics-impairing language compiler version.

9. The method of claim 1 wherein said parsing is by language-specific parsers.

10. The method of claim 8, where said semantics engine executes in operating systems comprising at least one of:
    Windows operating system,
    Linux operating system,
    Unix operating system,
    MAC operating system,
    IOS operating system, or
    Android operating system.

11. The method of claim 2, wherein said producing semantically-impaired source code avoids the use of forbidden techniques that cause programs to have problems caused by said forbidden techniques,
    said forbidden techniques comprising at least one of encryption or compression.

12. The method of claim 1 wherein the nonsense character strings are randomly generated.

13. The method of claim 1 wherein said nonsense character strings are neither a function of, nor mathematically related to said mnemonic identifiers they replace in said source code.

14. The method of claim 1 wherein different of said nonsense character strings are visually indistinguishable.

15. The method of claim 1 wherein said nonsense character strings are different for each invocation of said semantics engine.

16. The method of claim 1 wherein said replacing one or more of the mnemonic identifiers is irreversible.

17. The method of claim 1 wherein said determining the list of semantic mnemonic identifiers includes at least one of:
    one or more persons specifying said semantic mnemonic identifiers, or
    a script specifying one or more of said semantic mnemonic identifiers.

18. The method of claim 17 wherein said script is produced by at least one of:
    automatic generation as a result of said manually specifying, or
    manual generation using a text editor.

19. The method of claim 9, where said language-specific parsers can be added to the semantics engine to parse programming languages comprising at least one of:
    C# language,
    C++ language,
    Visual Basic language,
    SQL language,
    JAVA language,
    Oracle programming languages,
    web development languages,
    JavaScript language,
    scripting languages,
    MYSQL language, or
    application-specific languages, or
    assembly language.

20. The method of claim 1 wherein said source code files are secured by access controlled on the basis of at least one of:
    need-to-know,
    job title,
    job function, or
    discretionary choice.

* * * * *